(12) United States Patent
Ikeda et al.

(10) Patent No.: US 8,010,573 B2
(45) Date of Patent: Aug. 30, 2011

(54) LOG RECORDING APPARATUS

(75) Inventors: Nobuyuki Ikeda, Fuchu (JP); Satoko Takada, Tokyo (JP); Yukari Murata, Kawasaki (JP); Yuuji Umeda, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 12/195,692

(22) Filed: Aug. 21, 2008

(65) Prior Publication Data

US 2009/0125557 A1    May 14, 2009

(30) Foreign Application Priority Data

Nov. 13, 2007  (JP) .................................. 2007-294123

(51) Int. Cl.
*G06F 17/30* (2006.01)
(52) U.S. Cl. ........................................ 707/802; 719/318
(58) Field of Classification Search .................. None
See application file for complete search history.

(56) References Cited

U.S. PATENT DOCUMENTS

| | | |
|---|---|---|
| 6,182,086 B1 | 1/2001 | Lomet et al. |
| 7,802,237 B2 * | 9/2010 | Hoshino et al. ............... 717/133 |
| 2005/0273665 A1 | 12/2005 | Menadue |
| 2006/0214963 A1 | 9/2006 | Komatsu |

FOREIGN PATENT DOCUMENTS

| | | |
|---|---|---|
| EP | 1 160 670 A1 | 12/2001 |
| JP | 11-119860 | 4/1999 |
| JP | 2006-107348 | 4/2006 |
| JP | 2007-18100 | 1/2007 |

* cited by examiner

*Primary Examiner* — Hung Q Pham
(74) *Attorney, Agent, or Firm* — Oblon, Spivak, McClelland, Maier & Neustadt, L.L.P.

(57) ABSTRACT

It is possible to leave records with which analysis of a cause can be efficiently performed when a trouble occurs in an observation target system and realize reduction in the size of the records at the time of recording. The present invention is proposed as a log recording apparatus. This log recording apparatus is provided with: a cell number storage unit to store a cell number table with cell numbers, each being data for identifying a cell number from a state/event combination; a cell number generation unit acquiring data indicating an event and a state from an observation target system, to determine a cell number corresponding to the event and the state with the use of the cell number table stored in the cell number table storage unit and the data indicating the event and the state; a log data generation unit to generate log data which includes the cell number determined by the cell number generation unit; and a log data recording unit to record the log data generated by the log data generation unit.

3 Claims, 9 Drawing Sheets

FIG.1

| | ON | OFF | PLAY | STOP | ERROR |
|---|---|---|---|---|---|
| STOP | WAITING | — | — | — | — |
| | — | — | — | — | — |
| WAITING | — | WAITING | REPRODUCTION | — | FAILURE |
| | — | — | START REPRODUCTION | — | DISPLAY FAILURE |
| REPRODUCTION | — | WAITING | — | WAITING | FAILURE |
| | — | — | START REPRODUCTION | STOP REPROCUTION | STOP REPRODUCTON, DISPLAY FAILURE |
| FAILURE | — | WAITING | — | — | — |
| | — | DISPLAY FAILURE | — | — | — |

FIG.2

PRIOR ART

```
09:18:51    OPERATION1
09:19:09    OPERATION2
09:20:31    OPERATION1
09:21:18    OPERATION2
09:21:19    ERROR1
09:22:14    OPERATION1
09:22:15    OPERATION2
09:22:16    ERROR2
...
```

FIG.7 (PRIOR ART)

| | | |
|---|---|---|
| 09:18:51 | STATE A | OPERATION 1 |
| 09:19:09 | STATE B | OPERATION 2 |
| 09:20:31 | STATE C | OPERATION 1 |
| 09:21:18 | STATE C | OPERATION 2 |
| 09:21:19 | STATE D | ERROR 1 |
| 09:22:14 | STATE D | OPERATION 1 |
| 09:22:15 | STATE D | OPERATION 2 |
| 09:22:16 | STATE C | ERROR 2 |
| ... | | |

LOG RECORDING APPARATUS

CROSS-REFERENCE TO RELATED APPLICATION

This application is based on and claims the benefit of priority from the prior Japanese Patent Application No. 2007-294123, filed on Nov. 13, 2007, the entire contents of which are incorporated herein by reference.

BACKGROUND OF THE INVENTION

1. Field of the Invention

The present invention relates to a log recording apparatus, and in particular to a log recording apparatus capable of recording an event and a state in a monitoring target system while reducing the size of the record.

2. Description of the Related Art

Recently, it is increasingly common for a lot of apparatuses and systems to realize various functions by executing a program mounted on them. In such apparatuses and systems, it is commonly performed to record operating conditions as a log for the purpose of facilitating identification of the cause of a trouble when it occurs, that is, troubleshooting.

Such a log is recorded and stored in a storage device (such as a memory) included in an apparatus constituting the system. However, there are a lot of cases where the recording capacity for holding the log is limited in order to reduce hardware cost. Therefore, it is necessary to realize both of reduction in data size for satisfying the restriction of the recording capacity and facilitation of troubleshooting at the same time.

There are proposed various techniques as log recording methods in order to keep the amount of information necessary and sufficient to facilitate troubleshooting while reducing the storage capacity for holding a log (for example, References 1, 2 and 3 listed herein).

As techniques which satisfy the above requirements, mainly the solution methods as described below are proposed.

1) Only an Event is Recorded in a Log

Figure 7:
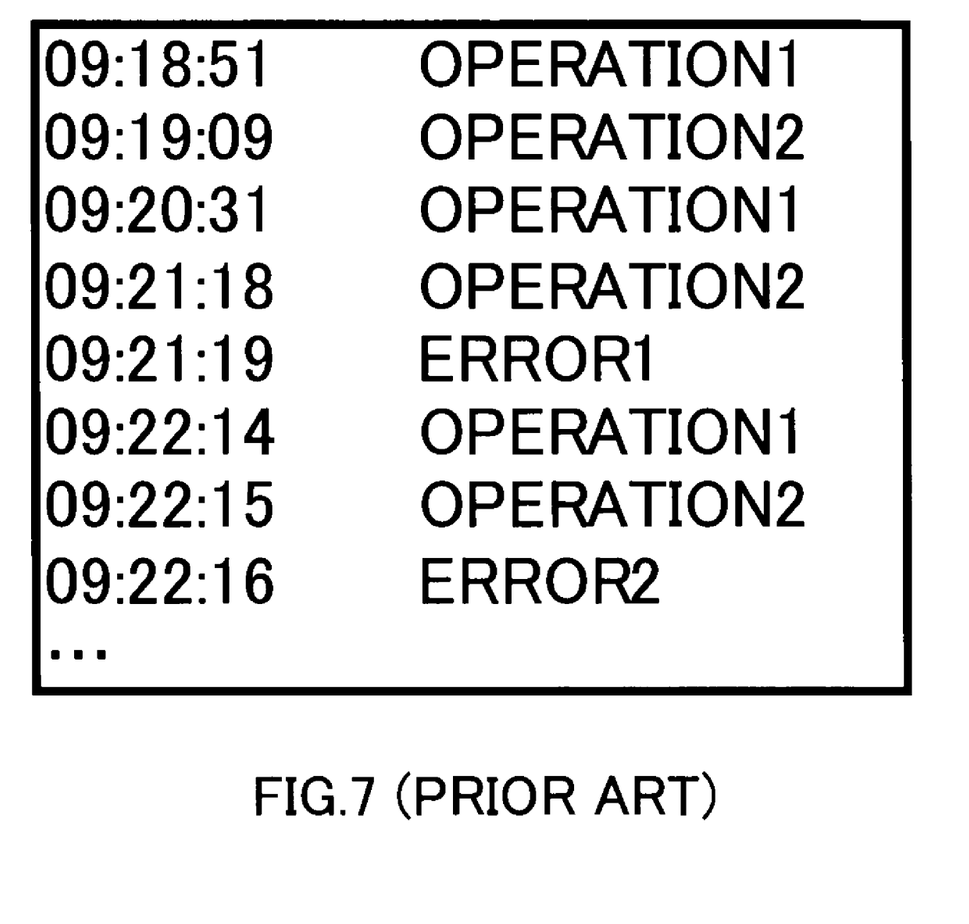
FIG. 7 is a diagram showing an example of a conventional log in which only an event and time are recorded.

As a common log recording method, a method of recording only an event or only an event and the time of the event as log data is known. FIG. 7 shows an example of a log in which only events and times are recorded.

2) An Event is Recorded in a Log Together with a State

Figure 8:
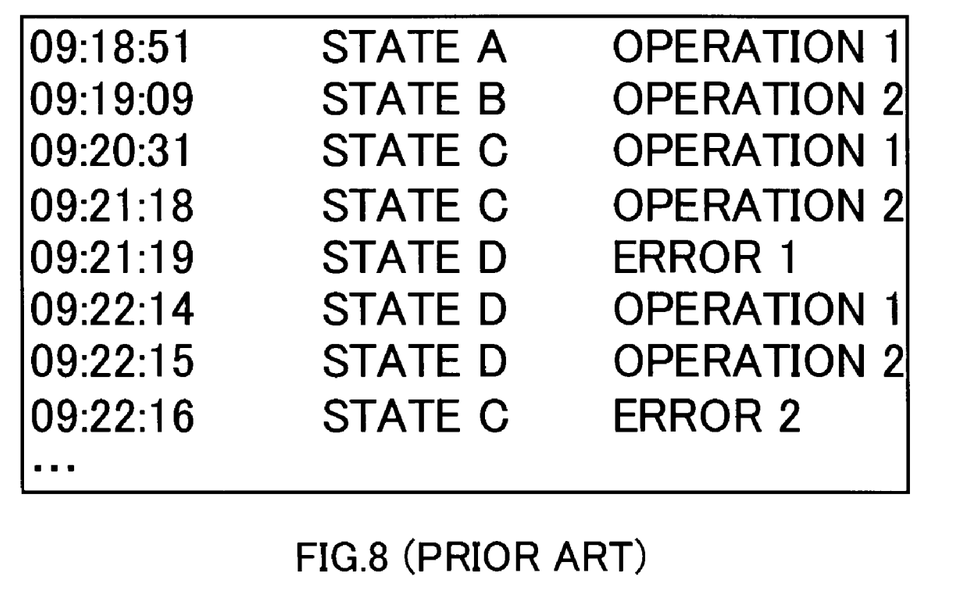
FIG. 8 is a diagram showing an example of a conventional log in which both an event and a state are recorded.

As a method in which the problems of 1) described above are improved, a method of log-recording an event together with a state is known. FIG. 8 shows an example of the log in which both an event and a state are recorded together. In the log format like that of the example in FIG. 8, a state before occurrence of an event and the event occurred are recorded as a pair together with time.

In the example shown in FIG. 8, it is seen that an operation 2, which is an event before occurrence of an error 1 and an error 2, occurred in different states of State C and State D, respectively. Therefore, in this example, the difference between the states in which the operation 2 occurred can be used as a clue for analyzing the cause of the problem.

Reference 1: JP-A 2006-107348 (KOKAI)

Reference 2: JP-A 2007-18100 (KOKAI)

Reference 3: JP-A 11-119860 (KOKAI)

[Problems of the Conventional Techniques]

1) Problem of the Case of Recording Only an Event in a Log

In general, there is known a method of recording only an event or only an event and the time when the event has occurred (see FIG. 7). This method has the following problem.

In general, even for the same event, the position (an execution line or a function in a program) which performs corresponding processing differs if the state of the system differs. Therefore, it is difficult to identify the position of a cause from the log including only events. The reason will be described below.

Figure 9:
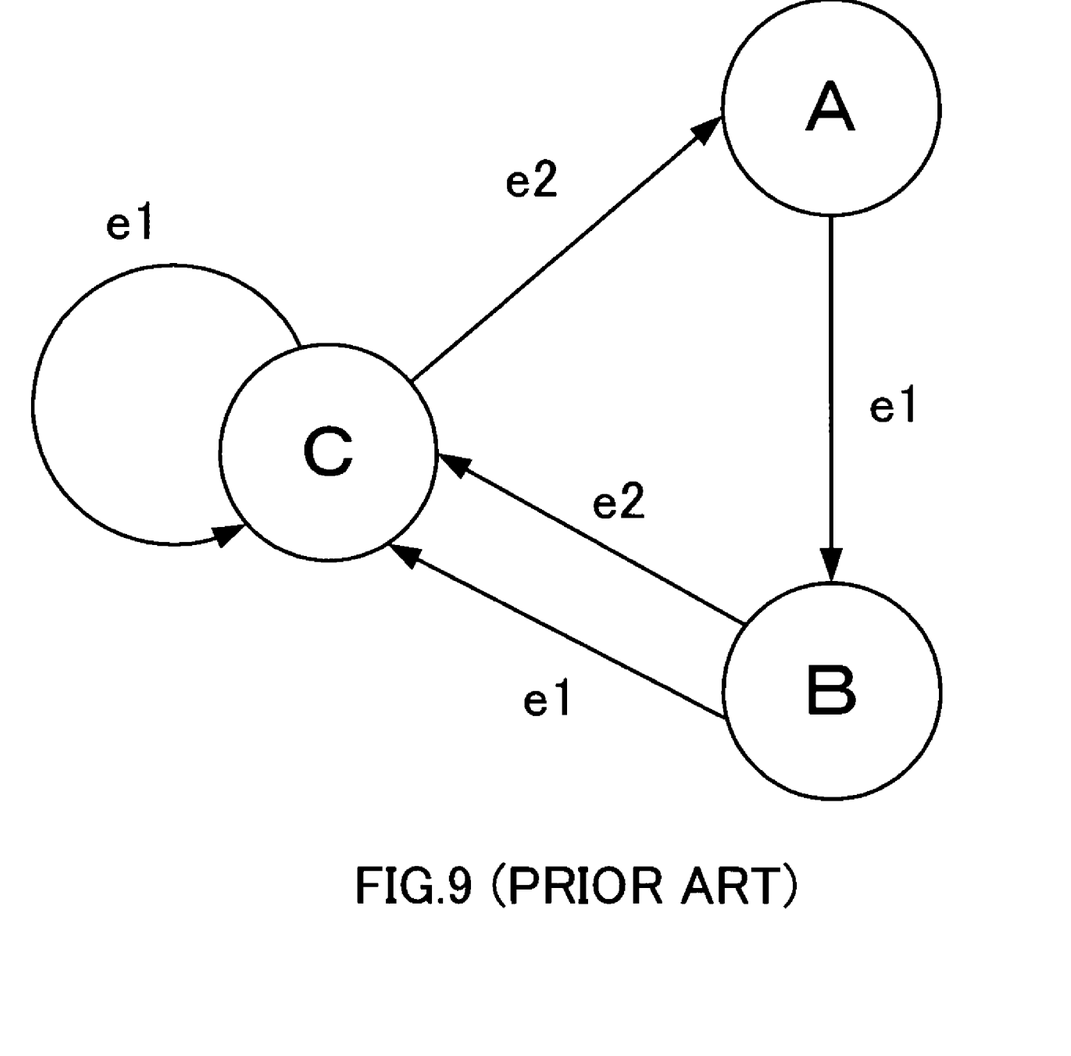
FIG. 9 is a diagram showing an example of a state transition diagram.

FIG. 9 shows an example of a state transition diagram. In the figure, each of reference symbols A, B and C denotes a state, and each of reference symbols e1, e2 and e3 denotes an event. It is assumed that there is a system which operates in accordance with the state transition diagram and which records only an event as log data. It is assumed that, in this system, a log "e1, e2" (which means that the event "e2" occurred after the event "e1" occurred) is recorded. In this case, if the state when the event "e1" was received was "A", then the state after the event "e2" was received was "C". If the state when the event "e1" was received was "B" or "C", then the state after the event "e2" was received was "A". If the state when the event "e1" was received was "C", then the state after the event "e2" was received was "A". That is, it is not possible to identify the states at the times when the events recorded in the log occurred, and therefore, it is not possible to identify the state in which a cause is thought to exist.

In the example shown in FIG. 7, an error 1 and an error 2 occurred after the same event, "operation 2". As the cause that different errors occur after the same operation is performed, difference between internal states at the time when the operation was executed is conceivable. However, since internal states are not recorded in the log recording format as shown in the example as described above, it is not possible to judge the cause of occurrence of the errors.

Figure 2:
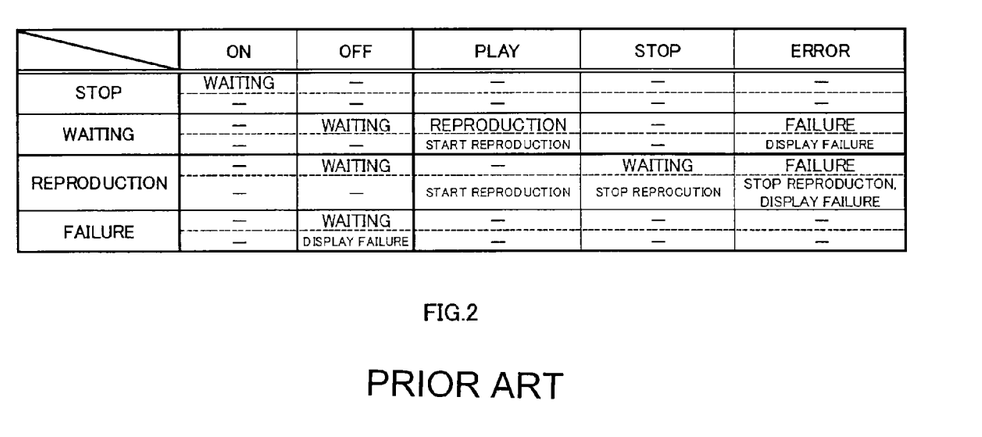
FIG. 2 is a diagram showing an example of a state transition table of the observation target system.

If all events are recorded, it is possible to identify the current state by following the state transition even from the log including only events. However, due to restriction of the recording capacity, it cannot be expected that the whole past log remains (some of them have been deleted by being overwritten). Furthermore, in the case of the method of recording all events, since log data of events which are not important for troubleshooting is also recorded, the recording capacity is wastefully used. An example of a state transition table of a certain system is shown in FIG. 2. This state transition table is tabular-format data constituted by four kinds of states, "STOP", "WAITING", "REPRODUCTION" and "FAILURE", and five kinds of events, "ON", "OFF", "PLAY", "STOP" and "ERROR". The four kinds of states correspond to four lines, and the five kinds of events correspond to five columns. This state transition table has four lines and five columns, and therefore, a total of twenty cells. In each cell, there are stored a state to which the state transitions (any one of the four states described above; hereinafter referred to as a "transition-destination state") and/or an action which occurs in the case where an event corresponding to the column in which the cell is included occurs in an state corresponding to the line in which the cell is included. However, if state transition does not occur and/or no action occurs, data is not stored (such a case is denoted by the symbol "-" in the figure). For example, if the event "ON" occurs when the state is "STOP", this corresponds to the cell at the upper-left corner of the state transition table. In the upper part of this cell, "WAITING" is written in the transition destination, and, in the lower part, the symbol "-" which indicates that an action does not occur is written. That is, this indicates that, if the event "ON" occurs when the state is "STOP", the state transitions from "STOP" to "WAITING", and an action does not occur.

If the event "ON" occurs when the state is "FAILURE", this corresponds to the cell at the lower-left corner of the state transition table. In the upper part of this cell, the symbol "-" which indicates that the state does not transition is written, and, in the lower part, the symbol "-" which indicates that an action does not occur is written. That is, this indicates that, if the event "ON" occurs when the state is "FAILURE", the state does not transition, and an action does not occur.

If the event "PLAY" occurs when the state is "WAITING", this corresponds to the cell on the central column and on the second line in the state transition table. In the upper part of this cell, "REPRODUCTION" which indicates a transition-destination state is written, and, in the lower part, "START REPRODUCTION", an action which is to occur, is described. That is, this indicates that, if the event "PLAY" occurs when the state is "WAITING", the state transitions from "WAITING" to "REPRODUCTION, and the action "PLAY" occurs. In the other cells also, a transition-destination "state" and an "action" are written similarly.

In this example, there may be a case where log data of events as shown below is not necessary.

i) The Events of ON, PLAY, STOP and ERROR after a Failure Occurs

Because an event which occurs after a problem occurs has nothing to do with the cause of the problem.

ii) The Event of OFF During Stop

Because it is experientially assumed not to cause a problem or because it can be presumed not to cause a problem from the viewpoint of the nature of hardware.

The log recording method in which only an event is recorded has the problems as described above. Troubleshooting is difficult unless an event corresponds to a state.

2) Problem of the Case of Recording an Event in a Log Together with a State

As a method for improving the problems of the above-described log recording method in which only an event is recorded, a method of log-recording an event together with a state is known. However, this method has the following problem.

i) A Large Part of the Storage Capacity is Consumed

For example, in the case of the state model indicated by the state transition table shown in FIG. 2, 3 bits (five kinds of events) are required as the number of bits per data (corresponding to one line in a log) in the case of the conventional log recording method in which only an event is recorded, while 5 bits (3 bits (five kinds of events)+2 bits (four kinds of states)=5 bits) are required in the case of the log recording method in which an event is recorded together with a state. That is, in comparison with the log recording method in which only an event is recorded, the log recording method in which an event is recorded together with a state has a problem that the data size is almost twice as much as that of the former method if the number of kinds of states and the number of kinds of events are almost the same between the two methods.

[Comparison with the Present Invention]

The techniques of references described above and the present invention will be compared.

1) JP-A 2006-107348 (Kokai) "Log Recording Apparatus and Log Recording Method"

In this conventional technique, a target to be recorded in a log is restricted with the use of a unit finer than an event, in a system the recording capacity is limited. An event is recorded together with information identifying the event. When the log data is not necessary any more, the record is deleted (overwritten) for capacity optimization. The technique disclosed in this reference is for recording an error event and identification information. Since information identifying a cell in a state transition table is not recorded unlike the present invention, it is not possible to reproduce the state at the time when an event was received unlike the present invention. Therefore, the technique is not sufficient for the purpose of troubleshooting.

2) JP-A 2007-18100 (Kokai) "Log Recording Apparatus and Log Recording Method"

This reference discloses a log recording apparatus and a log recording method which facilitate analysis of a failure. In this conventional technique, information after shipment and information before shipment are differentiated from each other and recorded in an EEPROM. This conventional technique is for recording only an error event, and such information identifying a cell in a state transition table as described in the present invention is not recorded. Therefore, it is not possible to reproduce the state at the time when an event was received unlike the present invention, and the technique is not sufficient for the purpose of troubleshooting.

3) JP-A 11-119860 (Kokai) "Electronic Control Apparatus"

This conventional technique is for recording messages exchanged among objects, which have been obtained by fractionalizing a program for controlling a control target according to unit functions, as log data. In this conventional technique, recording is not performed for predetermined processings for the purpose of improving the memory efficiency. The log recording method according to this conventional technique is for recording only a message, and a state is not recorded. Therefore, it is not possible to reproduce the state at the time when an event was received unlike the present invention, and the technique is not sufficient for the purpose of troubleshooting. Furthermore, in the case of inhibiting recording of certain processing as done in this conventional technique, the recording is always inhibited irrespective of the state of the system. The technique is different from the present invention in that it cannot realize fine optimization, such as "inhibiting recording in a certain state", unlike the present invention.

The object of the present invention is to solve the problems of the conventional techniques as described above. In particular, the object is to make it possible to leave records with which analysis of a cause can be efficiently performed when a trouble occurs in an observation target system and realize reduction in the size of the records at the time of recording.

SUMMARY OF THE INVENTION

As means for solving the problems, the present invention has the following characteristics.

The present invention is proposed as a log recording apparatus. This recording apparatus is provided with: a cell number storage unit to store a cell number table with cell numbers, each being data for identifying a cell number from a state/event combination; a cell number generation unit acquiring data indicating an event and a state from an observation target system, to determine a cell number corresponding to the event and the state with the use of the cell number table stored in the cell number table storage unit and the data indicating the event and the state; a log data generation unit to generate log data which includes the cell number determined by the cell number generation unit; and a log data recording unit to record the log data generated by the log data generation unit.

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

Now, an embodiment of the present invention will be described with reference to drawings.

1. DEFINITION OF TERMS

First, terms to be used in this specification will be defined below.
(1) Log
A "log" means records of behaviors of a system recorded on a storage device or a storage medium.
(2) Troubleshooting
"Troubleshooting" means to identify a cause by analyzing a log when a trouble occurs in a system.
(3) State Transition Table
A "state transition table" is an expression of behaviors of a system in a tabular format with the use of event/state combinations, and an action and a state transition destination are written for each of the event/state combinations.
(4) Cell
A "cell" is a square in the state transition table. Each cell corresponds to a combination of one event and one state.

2. SYSTEM CONFIGURATION EXAMPLE

Figure 1:
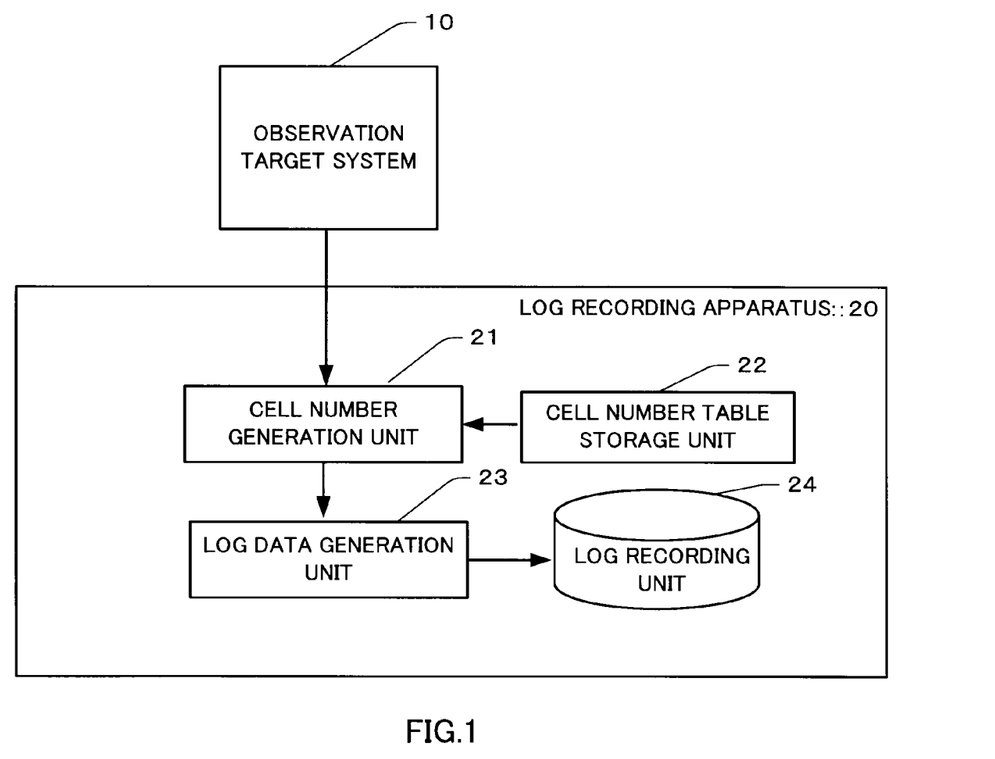
FIG. 1 is a block diagram showing an example of the entire configuration of a log recording apparatus and a system targeted by observation by the log recording apparatus.

Next, a configuration example of a log recording apparatus according to the present invention will be described. FIG. 1 is a block diagram showing an example of the entire configuration of a log recording apparatus according to this embodiment and a system (or an apparatus) targeted by observation by the log recording apparatus.

A log recording apparatus 20 is communicably connected to an observation target system 10. In the configuration example shown in FIG. 1, the log recording apparatus 20 and the observation target system 10 are shown as a system and an apparatus separately independent from each other. However, the log recording apparatus 20 is not necessarily required to be an apparatus separate from the observation target system 10, and it may be, for example, a microcomputer or a module incorporated in the observation target system 10.

[2.1. Observation Target System]

The above observation target system 10 will be described. The observation target system 10 may any system or apparatus if it is a system or an apparatus which realizes the operation specifications indicated by a state transition table. Any apparatus or system, for example, a manufacturing plant control system and a home electric appliance can be targeted by observation by the log recording apparatus 20 according to the present invention, irrespective of its purpose, scale and configuration.

The observation target system 10 has a function and a configuration enabling communication of an event which occurs in the operation of the observation target system 10, to the log recording apparatus 20 together with the state at the time of occurrence of the event. Data transmission for communicating an event and the state at the time of occurrence of the event from the observation target system 10 to the log recording apparatus 20 may be performed from the observation target system 10 to the log recording apparatus 20, or it is also possible that the log recording apparatus 20 performs polling to the observation target system 10 and receives data transmission from the observation target system 10.

[2.2. Log Recording Apparatus]

Next, the above log recording apparatus 20 will be described. The log recording apparatus 20 is an apparatus having a function of receiving data which has been transmitted from the observation target system 10 and which shows an event that has occurred in the observation target system 10 and the state at the time of occurrence of the event, generating log data on the basis of the data and recording the log data.

The log recording apparatus 20 is an information processing apparatus provided with a central processing unit (CPU), a main memory (RAM), a read-only memory (ROM), an input/output device (I/O), and an external storage device, such as a hard disk device, when necessary, and it is, for example, an apparatus such as a computer and a workstation, a microcomputer (microprocessor), or the like. In the ROM or the hard disk device, there is stored a program for causing the information processing apparatus to function as the log recording apparatus 20. By mounting this program on the main memory, and the CPU executing the program, the log recording apparatus 20 is realized.

In the configuration example shown in FIG. 1, the log recording apparatus 20 has a cell number generation unit 21, a cell number table storage unit 22 connected to the cell number generation unit 21, a log data generation unit 23 connected to the cell number generation unit 21, and a log recording unit 24 connected to the log data generation unit 23.

The above units 21 to 24 are components realized by the CPU executing the program, and it does not matter even if those units do not correspond to individual circuits or apparatuses. Here, the expression "be connected" is used to include a state in which data is sent and received, and it does not mean only physical connection being performed.

Now, each of the components of the log recording apparatus 20 will be described in detail.

[2.2.1. Cell Number Generation Unit]

The cell number generation unit 21 corresponding to the cell number generation unit of the present invention acquires a value indicating a state and an event from the observation target system 10. The cell number generation unit 21 determines a cell number to be described later, from the data including the two elements of the state and the event which has been transmitted from the observation target system 10, and outputs the determined cell number. The cell number is information associated with a cell in a state transition table. The state transition table is data showing events and states in the observation target system 10. FIG. 2 shows an example of the state transition table of the observation target system 10. The contents of the state transition table shown in FIG. 2 are similar to the contents of FIG. 8 described before, and therefore, detailed description of the contents is omitted here.

Returning to FIG. 1, description of the cell number generation unit 21 will be continued. The cell number generation unit 21 determines a cell number corresponding to the combination of the value indicating a state and the event which have been described before by referring to a cell number table which is data stored in the cell number table storage unit 22 to be described later, and outputs the cell number to the log data generation unit 23.

It is possible that the cell number is not limited to a number or symbol identifying a cell but includes a number or symbol indicating that log recording is not to be performed (hereinafter referred to as a recording inhibition number). If the cell number determined by referring to the cell number table is the number or symbol indicating that log recording is not to be performed, then the cell number generation unit 21 does not transmit data to the log data generation unit 23 to be described later or transmits a message to the effect that generation of log data is omitted. In this case, recording of new log data is omitted.

[2.2.2. Cell Number Table Storage Unit]

The cell number table storage unit 22 corresponding to the cell number table storage unit of the present invention has a function of storing the cell number table described before.

The cell number table is data for identifying a cell number from a state/event combination on the basis of the state transition table specifications. In the simplest method for constructing a cell number table, the cell number table can be realized by a two-dimensional array having the size (the number of cells) determined by the number of states×the number of events. As this cell number, the recording inhibition number, which is a symbol indicating that "recording is not to be performed", may be set to a suitable number (for example, 0) or symbol.

Figure 3:
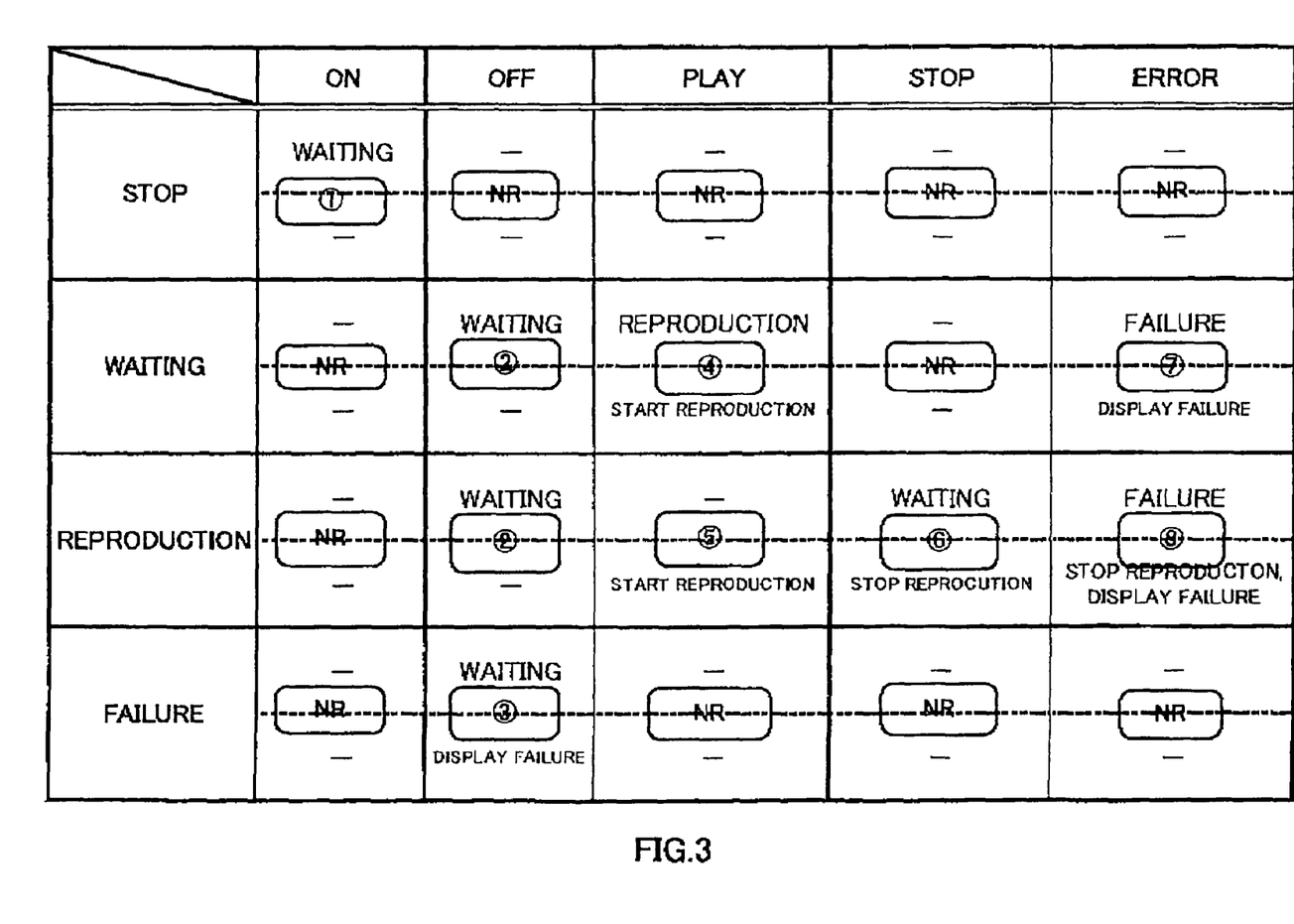
FIG. 3 is a diagram showing a data configuration example of a cell number table stored in a cell number table storage unit.

FIG. 3 is a diagram showing a data configuration example of the cell number table stored in the cell number table storage unit 22. The cell number table has cells similar to those of a corresponding state transition table. Each cell of the cell number table stores information (though a number is used as information in this example, any information or data is possible if it uniquely identifies a corresponding destination, such as a code and a symbol) associated with the contents (a transition-destination state and an action) of a corresponding cell of the state transition table.

In the example shown in FIG. 3, there are eight kinds of cell contents of the corresponding state transition table, that is, eight kinds of combinations of a transition-destination state and an action to be activated. Therefore, in each cell of the cell number table, any of the numbers [1] to [8] is stored according to the contents of a corresponding cell of the state transition table. In this cell number table, a recording inhibition number, which is a number or symbol indicating that "log data output is not to be performed", may be set in a particular cell as a cell number or instead of a cell number. This is intended to eliminate such an event that it is meaningless or unnecessary to store the log data thereof, from a log and reduce consumption of the storage capacity. In the example shown in FIG. 3, if a recording inhibition number "NR" is stored in a cell corresponding to a state/event combination transmitted from a monitoring target system, the log data generation unit 23 to be described later is prevented from performing log recording.

The cell in which the recording inhibition number is set is such a cell that an event of the combination never occurs or a cell considered not to be a cause for occurrence of a fault.

The characteristics of the cell number table according to the present invention will be described below.

(1) A log of the observation target system 10 is recorded with the use of cell numbers corresponding to the cells of the state transition table. According to this characteristic, it is possible to further optimize the memory in comparison with the log recording method in which an event and a state are separately recorded.

In the case of the example shown in FIG. 3, since it is necessary to record a log using the eight kinds of cell numbers, the information size required per data of log recording according to the present invention is 3 bits. On the other hand, in the case of recording both an event (five kinds) and a state (four kinds) as in the conventional log recording method, the information size of 5 bits, a total of 3 bits for an event and 2 bits for a state, is required. Therefore, in the present invention, the information size required to record one data can be smaller.

(2) In the log recording method of the present invention, it is possible to assign a recording inhibition number to a cell which satisfies a certain condition as a cell number. Due to this characteristic, such an event as need not be log-recorded (for example, an ERROR event after occurrence of a failure) is not recorded, so that consumption of the storage capacity by the log recording unit 24 can be reduced. If it is assumed that the frequency of occurrence of the event/state combination corresponding to each cell does not fluctuate, log recording is required twenty times when the event/state combination corresponding to each cell of the state transition table occurs once per unit time, in the conventional log recording method. In comparison, according to the log recording method using the cell number table of the present invention, the number of times of log recording performed is 9 (20 times−11 times=9 times) because recording for cells corresponding to the recording inhibition number "NR" is not necessary among the twenty times (see FIG. 3). That is, the number of times of log recording in the log recording method of the present invention is less than half ($\%_{20}$) the number of times in the conventional log recording method in which all event/state combinations are recorded.

(3) In the cell number table of the present invention, the same cell number may be assigned to multiple cells. Because the cell number table has this characteristic, it is possible to suppress increase in the number of cell number classifications in the log recording method of the present invention, and as a result, it is possible to reduce consumption of the storage capacity. For example, in the example shown in FIG. 3 described before, two cells correspond to the cell number "2". Since the contents of these two cells are the same behavior (the transition-destination state: STOP, and action: none), the same cell number is used for both cells. As a result, the number of the kinds of cell numbers can be suppressed, and the number of bits required for information used for a cell number can be suppressed.

[2.2.3. Log Data Generation Unit]

Returning to FIG. 1, the log data generation unit 23 will be described. The log data generation unit 23 corresponding to the log data generation unit of the present invention has a function of generating log data on the basis of a cell number outputted from the cell number generation unit 21 and outputting the log data. The contents of the log data may be in any configuration if the data includes a cell number. In general, the log data is generated in a format in which a cell number is recorded together with time. It is desirable to consider the method for expressing the time included in the log data taking account of trade-off with the memory restriction. Furthermore, if an event from a different system is recorded, it is possible to analyze the operations of both systems to some extent even if the log data does not include information indicating time. Therefore, the present invention can be realized even in the case of log data which does not include time.

[2.2.4. Log Recording Unit]

The log recording unit 24 corresponding to the log recording unit of the present invention has a function of storing and holding log data outputted by the log data generation unit 23. The log recording unit 24 may be realized by a non-volatile memory, for example, an EEPROM or a flash memory, or it may be realized by a permanent storage such as a hard disk.

Figure 4:
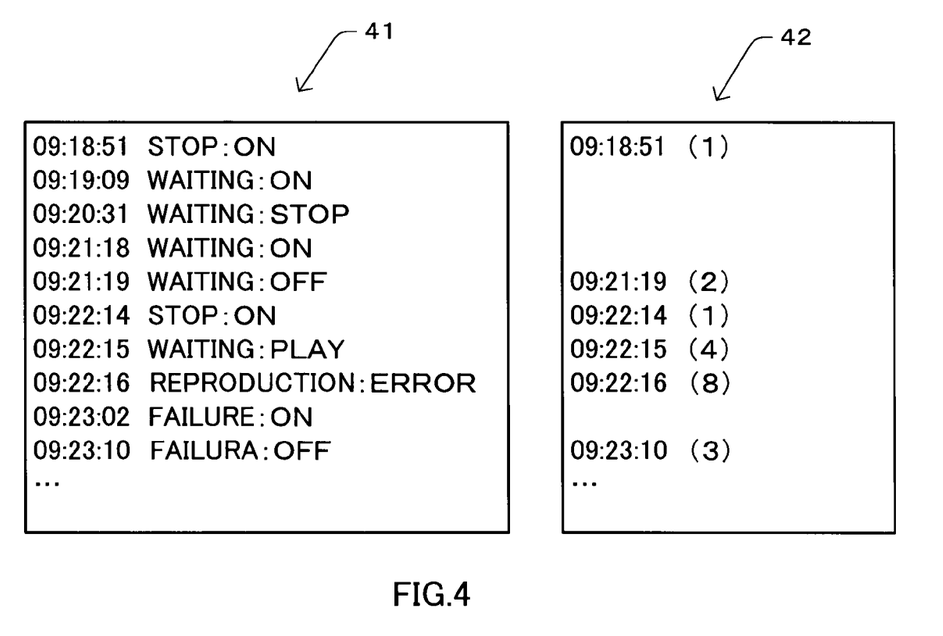
FIG. 4 is a diagram showing an example of a log recorded in a log recording unit.

FIG. 4 shows an example of a log recorded in the log recording unit 24. FIG. 4 shows an example of a log (log 41) according to the conventional log recording method and a log in the case where the state/event combinations recorded in the log 41 have been recorded by the log recording method according to the present invention (hereinafter referred to as a log 42). Both a state and an event are recorded in the log 41 by the conventional log recording method, while only a cell number is recorded in the log 42 by the log recording method of the present invention. Therefore, according to the log recording method of the present invention, more log data can be recorded even if the storage capacity is limited.

Furthermore, in the log recording method of the present invention, by giving a recording inhibition number to an event/state combination judged to be unimportant in advance as a cell number, the number of times of log recording (or the number of log data: corresponding to the number of lines in the figure) can be reduced, and it is possible to record a lot of log data even when the storage capacity is further limited.

3. OPERATION EXAMPLE

Figure 5:
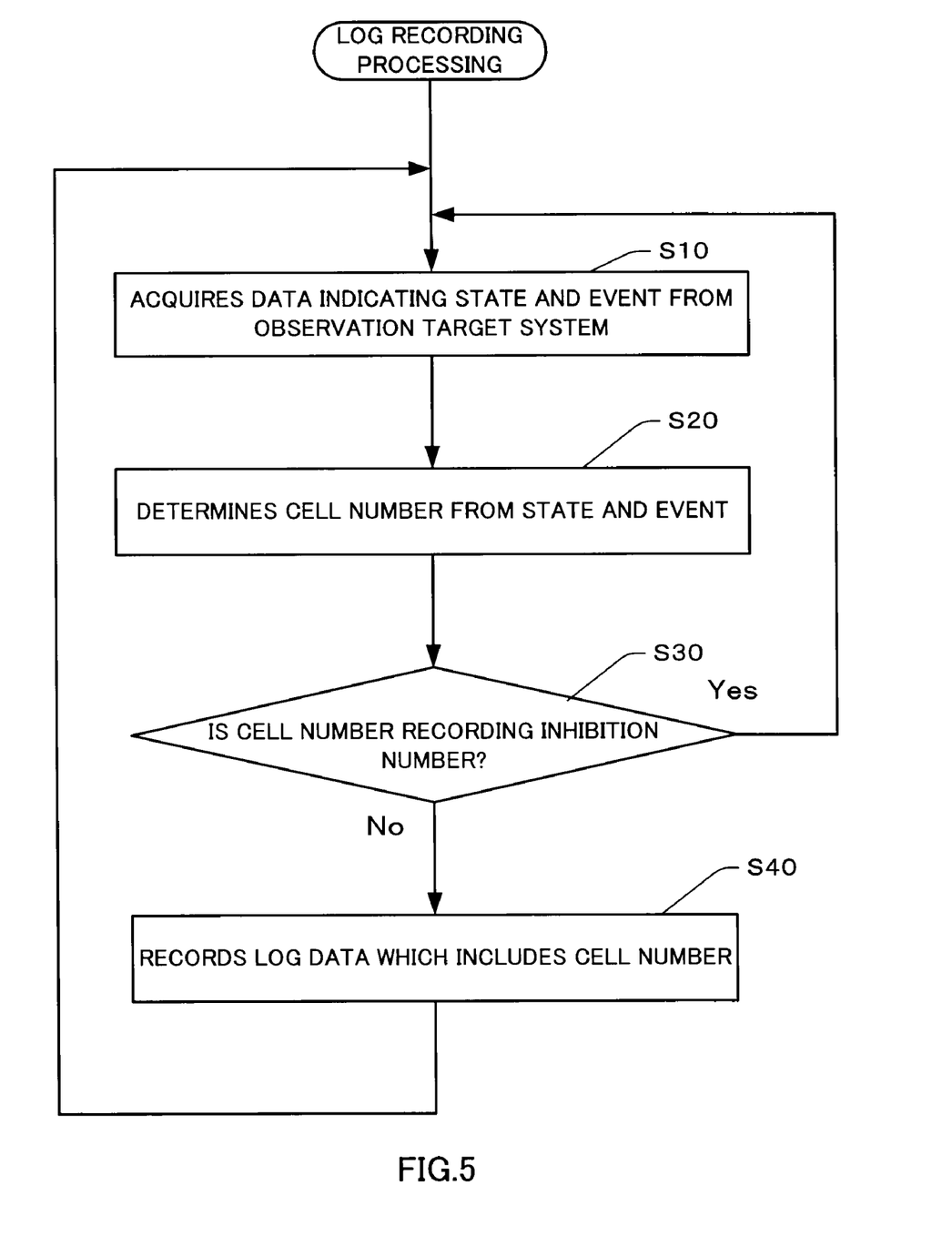
FIG. 5 is a flowchart showing an example of log recording processing which is an example of the operation of the log recording apparatus.

Next, an example of the operation of the log recording apparatus 20 according to this embodiment will be described. FIG. 5 is a flowchart showing an example of log recording processing which is an example of the operation of the log recording apparatus 20. Now, the example of the operation of the log recording apparatus 20 will be described with reference to this flowchart.

When the log recording processing is started, the log recording apparatus 20, more particularly, the cell number generation unit 21 receives data showing a state and an event which have occurred within the observation target system 10 from the observation target system 10 and acquires the data (step S10).

The cell number generation unit 21 refers to a cell number table stored in the cell number table storage unit 22 and acquires a cell number stored in a cell corresponding to the received state/event combination (step S20). In the case of this example, it is assumed that a cell which stores the recording inhibition number described before exists as a cell number.

The cell number generation unit 21 outputs the acquired cell number to the log data generation unit 23.

The log data generation unit 23 which has acquired the cell number from the cell number generation unit 21 first judges whether the cell number is a recording inhibition number or not (step S30). If the cell number is a recording inhibition number (step S30: Yes), then the cell number generation unit 21 returns control to step S10 without recording log data. On the other hand, if it is judged by the judgment at step S30 that the cell number is not a recording inhibition number (step S30: No), then the log data generation unit 23 generates log data including the cell number (see the log 42 in FIG. 4), and causes the log recording unit 24 to record the log data (step S40).

After that, the log recording apparatus 20 returns control to step S10 again, and then it repeats steps S10 to S40. By the log recording processing being performed in this way, log records as in the log 42 in FIG. 4 are accumulated in the log recording unit 24.

4. VARIATION EXAMPLE

The present invention is realized even if the log recording apparatus 20 is varied as described below.

Figure 6:
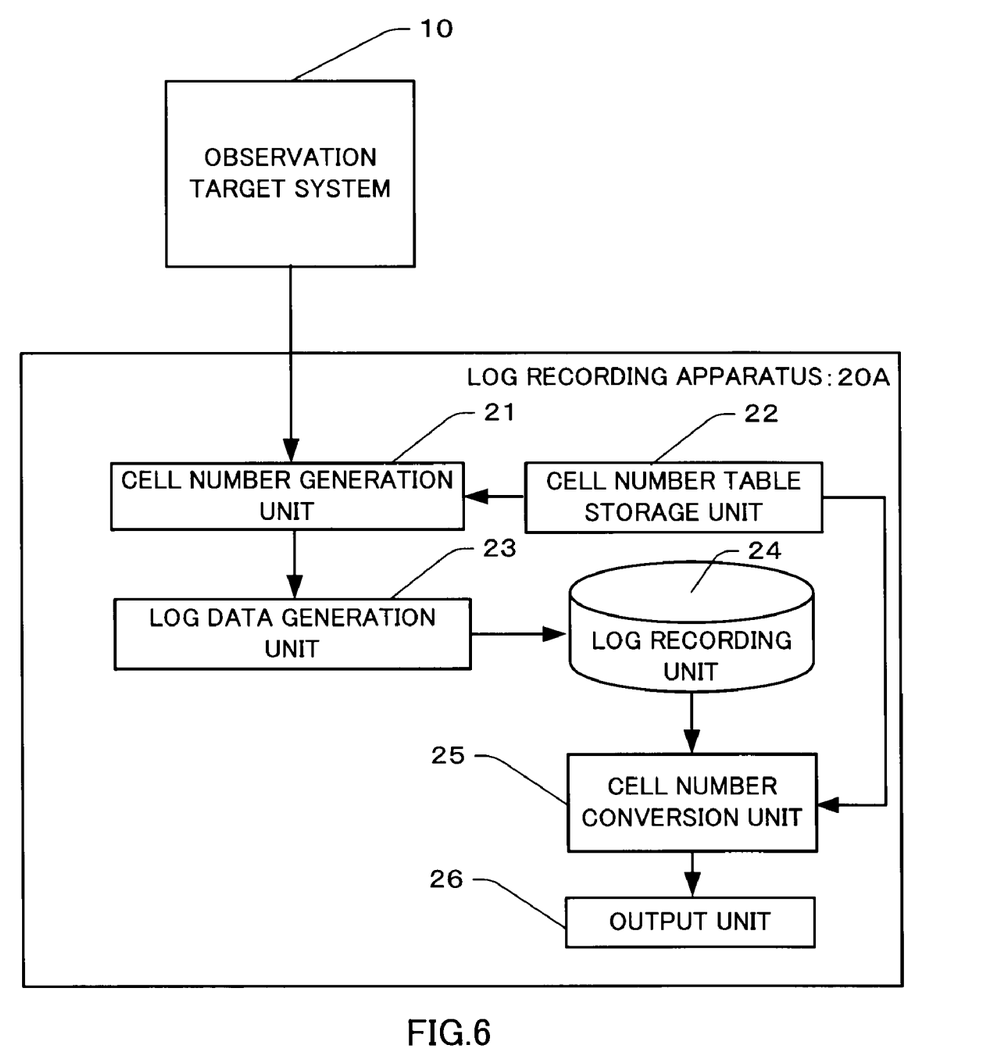
FIG. 6 is a functional block diagram showing a configuration example of a variation example of the log recording apparatus.

FIG. 6 is a functional block diagram showing a configuration example of a variation example of the log recording apparatus 20 (referred to as a log recording apparatus 20A for distinction). The same components as the components of the log recording apparatus 20 are given the same reference numerals, and detailed description of the components is omitted.

The log recording apparatus 20A is different from the log recording apparatus 20 in that it further has a function of converting log data in which a cell number is written to log data of an event/state combination corresponding to the cell number and outputting the log data.

The log recording apparatus 20A has a configuration basically similar to that of the log recording apparatus 20. However, it further has a cell number conversion unit 25 connected to the log recording unit 24 and the cell number table storage unit 22, and an output unit 26 connected to the cell number conversion unit 25, in addition to the components which the log recording apparatus 20 has.

The cell number conversion unit 25 corresponding to the cell number conversion unit of the present invention converts a part of a log recorded in the log recording unit 24, in which cell numbers are written, to event/state combinations corresponding to the cell numbers. The cell number conversion unit 25 has a function of determining a cell corresponding to the cell number recorded on each line of the log, from a cell number table stored in the cell number table storage unit 22, identifying the line (state) and the column (event) corresponding to the cell, replacing the identified state and event with the cell number, and outputting the cell number.

The output unit 26 has a function of outputting a log which is the result of the conversion by the cell number conversion unit 25 (hereinafter referred to as a converted log) in a user-recognizable form, and it is, for example, a liquid crystal display device, a printer or the like. The result of the output by the output unit is in a form similar to the form of the conventional log 41 shown in FIG. 4.

According to this variation example, it is possible for a user to easily know the contents of an event and a state from a log outputted by the log recording apparatus 20A and take necessary measures (for example, identification of the cause of a failure).

5. ADVANTAGES

According to the present invention, it is possible to leave records with which analysis of a cause can be efficiently performed when a trouble occurs in an observation target system and realize reduction in the size of the records at the time of recording.

In conclusion, the advantages of the present invention will be summarized.

According to the present invention, it is possible to realize more accurate troubleshooting than the case of recording only an event. That is, by checking a cell number against a state transition table, a state, an event and an action can be reproduced, and it is possible to reproduce the conditions more accurately than the case of recording only an event. Furthermore, the recording of the present invention is more efficient than recording both of a state and an event.

(1) It is possible to record more log data even the storage capacity is limited, by eliminating records of events which are not effective for troubleshooting.

(2) It is possible to shorten the bit length of data required for log recording by targeting only important cells for log recording.

(3) The bit length can be used without wasting it.

On the assumption of a configuration in which all cells are recorded, the conventional log recording method requires 6 bits (3 bits+3 bits=6 bits) for recording in the case of five kinds of events and five kinds of states. In comparison, in the log recording method of the present invention, only 5 bits are required because of 25 (5×5=25) kinds of cells.

[Merit of the Invention]

According to the present invention, it is possible to leave records with which analysis of a cause can be efficiently performed when a trouble occurs in an observation target system and realize reduction in the size of the records at the time of recording.

Additional advantages and modifications will readily occur to those skilled in the art. Therefore, the invention in its broader aspects is not limited to the specific details or representative embodiments shown and described herein. Accordingly, various modification may be made without departing from the spirit or scope of the general inventive concept as defined by the appended claims and their equivalents.

What is claimed is:

1. A log recording apparatus comprising:
a processor having an operation in which plural programming units are executed, including,
a cell number storage unit to store a cell number table with cell numbers, each being data for identifying a cell with a combination of an event and a state;
a cell number generation unit acquiring first log data indicating an event and a state from an observation target system, to determine a cell number corresponding to the event and the state of the first log data with the use of the cell number table stored in the cell number table storage unit;
a log data generation unit to generate second log data containing the cell number determined by the cell number generation unit; and
a log data recording unit to record the second log data generated by the log data generation unit.

2. The apparatus according to claim 1, wherein cell numbers included in the cell number table include a recording inhibition number indicating that recording of the second log data is not to be performed, and,
if the cell number determined by the cell number generation unit is the recording inhibition number, the log data recording unit does not record the second log data.

3. The apparatus according to claim 1, further comprising a cell number conversion unit configured to convert the cell number of the second log data, into a combination of the state and the event using the cell number table and configured to output the combination of the state and event.

* * * * *